US007895440B2

(12) United States Patent
Cardonnel et al.

(10) Patent No.: US 7,895,440 B2

(45) Date of Patent: Feb. 22, 2011

(54) METHOD OF ENCRYPTING DIGITAL DATA, A METHOD OF MASKING A BIOMETRIC PRINT, AND APPLICATION TO MAKING A SECURITY DOCUMENT SECURE

(75) Inventors: Cédric Cardonnel, Carnuox En Provence (FR); Eric Brier, Aubagne (FR); David Naccache, Paris (FR); Jean-Sébastien Coron, Luxembourg (LU)

(73) Assignee: Gemalto SA, Meudon (FR)

( * ) Notice: Subject to any disclaimer, the term of this patent is extended or adjusted under 35 U.S.C. 154(b) by 1135 days.

(21) Appl. No.: 11/596,560

(22) PCT Filed: May 11, 2005

(86) PCT No.: PCT/EP2005/052151

§ 371 (c)(1), (2), (4) Date: Nov. 14, 2006

(87) PCT Pub. No.: WO2005/111915

PCT Pub. Date: Nov. 24, 2005

(65) Prior Publication Data

US 2007/0183636 A1 Aug. 9, 2007

(30) Foreign Application Priority Data

May 14, 2004 (FR) .................................. 04 05236

(51) Int. Cl.
*H04L 9/32* (2006.01)

(52) U.S. Cl. ....................... 713/176; 382/115; 382/116; 382/117; 382/118; 382/124; 382/125; 382/126; 382/127; 902/3; 340/5.52; 340/5.82; 340/5.83; 340/5.84; 340/5.85; 340/5.86; 713/186

(58) Field of Classification Search ................. 713/155, 713/180, 168, 182–186, 176; 380/282, 285, 380/286, 44–47; 340/5.52, 5.82–5.86
See application file for complete search history.

(56) References Cited

U.S. PATENT DOCUMENTS

| | | | | |
|---|---|---|---|---|
| 6,185,316 | B1 | 2/2001 | Buffam | |
| 6,658,626 | B1 * | 12/2003 | Aiken | 715/205 |
| 6,697,947 | B1 | 2/2004 | Matyas, Jr. et al. | |
| 7,152,786 | B2 * | 12/2006 | Brundage et al. | 235/380 |
| 7,200,753 | B1 * | 4/2007 | Shinzaki et al. | 713/182 |

* cited by examiner

*Primary Examiner*—Taghi T. Arani
*Assistant Examiner*—Josnel Jeudy
(74) *Attorney, Agent, or Firm*—Buchanan, Ingersoll & Rooney PC

(57) ABSTRACT

The invention relates to a method of masking a plain datum b having n bits. The inventive method is characterised in that a masked datum m is produced using the following masking function: (I), wherein p is a prime number, $b_i$ is the bit at position i of plain datum b, and $q_i$ is the prime number at position i in a set of prime numbers $(q_1, \ldots, q_n)$. The invention also relates to a method of masking a biometric print, consisting in: determining a set of s real minutiae which are characteristic of the print; mixing and arranging the real minutiae with t false minutiae; and forming a mixed biometric datum b having n=s+t bits, such that, for any i: $b_i$=1 if position i corresponds to a real minutia, and $b_i$=0 if position i corresponds to a false minutia. The invention can be used to secure a security document such as a bank cheque.

$$m = \prod_{i=1}^{n} q_i^{b_i} \bmod p \qquad \text{(I)}$$

8 Claims, No Drawings

METHOD OF ENCRYPTING DIGITAL DATA, A METHOD OF MASKING A BIOMETRIC PRINT, AND APPLICATION TO MAKING A SECURITY DOCUMENT SECURE

The invention relates to biometric identification and/or authentication systems. These systems manipulate all types of biometric data such as, for example, biometric prints and digital eye, skin, face or even voice prints.

Biometric prints are increasingly used as a way of completing user passwords or handwritten signatures, in particular for applications requiring a high level of security. Indeed, the use of a biometric print is a good complement for a password or a handwritten signature, insofar as it is difficult for a biometric print to be stolen from its real owner, and it cannot be imitated or copied either. On the other hand, regarding this security and insofar as a biometric print cannot be replaced, it is essential to prevent direct access to this print in order to guarantee the security of the persons and the reliability of the print.

For this reason, it is possible for example to use known masking methods for masking the biometric print to be secured. The masked print can then be used instead of the plain print for signing messages, authenticating the identity of a person, etc. The advantage of such methods is that they use hash functions which are one-way functions, meaning they cannot be inverted. In other words, if a print masked by a hash function from a plain print is known, it is not possible to discover the plain print, even when all the parameters of the hash function are known.

It is well known, furthermore, that it is not possible to take two strictly identical biometric prints from the same individual at different times. First of all, because it is very difficult to position, in a strictly identical manner but at different times, the same measurement instrument adapted to take said biometric print. Also because the environment (temperature, humidity, etc.) and the general health condition (stress, skin disease, etc.) of the individual at the time of taking the print can interfere with the result of the process.

And yet, with the known hash functions applied to two almost identical initial data, the corresponding masked data are very different and no longer correlated, so that it is not possible, by comparing them, to deduce whether or not the initial data are identical with few errors. It is not therefore possible to use known hash functions to mask a biometric print.

A first aim of the invention is to provide a masking method using a new hash function, which is more suitable than known hash functions for masking biometric prints. In a preferred embodiment of the invention, the masking method according to the invention is used to secure a biometric print.

Finally, a second aim of the invention is to use the masking method of the invention to secure a security document such as, for example, a bank cheque.

The first aim of the invention is achieved by means of a method of masking a plain datum b having n bits, characterised in that a masked datum m is produced using the following hash function:

$$m = \prod_{i=1}^{n} q_i^{b_i} \bmod p,$$

where p is a prime number, $b_i$ is the bit at position i of plain datum b, and $q_i$ is the prime number at position i in a set of prime numbers $(q_i, \ldots, q_n)$. Preferably, p is a large prime number and the components of the set of prime numbers are small.

Compared with known hash functions, the function $$m = \prod_{i=1}^{n} q_i^{b_i} \bmod p$$

has the main advantage of being tolerant of errors, as will be seen in greater detail below, which means it is particularly well adapted for masking biometric data.

In a preferred embodiment of the invention, the above masking method is applied to a biometric print. For this reason, the method consists in determining a set of s real minutiae, which are characteristic of said print, mixing and arranging the real minutiae with t false minutiae, and forming a mixed biometric datum b having n=s+t bits, such that, for any i:

$b_i=1$ if position i corresponds to a real minutia and $b_i=0$ if position i corresponds to a false minutia and the hash function according to the invention is applied to this mixed datum in order to produce a masked datum.

The real and false minutiae are preferably mixed in a random fashion.

The second aim of the invention consists in a method of securing a security document, for example a bank cheque, during which, after having obtained a reference datum by masking a biometric print according to a method as described above,

- said reference datum is stored on or in the security document, or
- a barcode is associated with said reference datum, which is stored on or in the security document, the reference datum and the barcode also being stored in a table.

A series of preferred embodiments of the invention are described below.

First of all is a detailed description of the masking method according to the invention. The following hash function is used in order to mask a plain datum $b=(b_n, \ldots, b_1)$, having n bits:

$$m = \prod_{i=1}^{n} q_i^{b_i} \bmod p$$

The function uses as parameters a set $(q_n, \ldots, q_1)$ of small prime numbers, for example integers having around 60 bits. The function also uses a parameter p which is a large integer, for example having around 1024 bits. p is preferably selected such that $2^*q_n$, ^2t<p<4*$q_n$^2t, where t is a number of accepted errors.

Unlike known hash functions, the function according to the invention is not very sensitive to errors, that is to say that, knowing two data m, μ masked by this function, it is possible to tell whether the corresponding original plain data b, β are identical, with a maximum of approximately t errors.

Indeed, m, μ are obtained by the following relations:

$$m = \prod_{i=1}^{n} q_i^{b_i} \bmod p \text{ and } \mu = \prod_{i=1}^{n} q_i^{\beta_i} \bmod p,$$

The following is also defined:

$$\lambda = \frac{m}{\mu}\bmod(p) = \frac{a}{\alpha}\bmod p$$

$$\text{with } a = \prod_{i\in\Delta_i} q_i \bmod p \text{ and } \alpha = \prod_{i\in\Gamma_i} q_i \bmod p$$

where $\Delta_i$ is the set of indexes i comprised between 1 and n for which $b_i=1$ and $\beta_i=0$, and where $\Gamma_i$ is the set of indexes comprised between 1 and n for which $b_i=0$ and $\beta_i=1$. The sum of the sizes of the sets $\Delta_i$ and $\Gamma_i$ is at most equal to t, t being the number of β bits that are different from the b bits in the same position, corresponding to the maximum acceptable number of errors.

a and α, which are products of small prime numbers $q_i$, are also small numbers, which additionally verify the relation: $a*\lambda=\alpha \bmod p$. From the latter equality and the number λ, it is then possible to calculate the numbers a and α. Breaking down the numbers a and α into prime numbers makes it possible, ultimately, to factorise a and α. The breakdown is facilitated in part by the fact that a and α are broken down, in principle, into small prime numbers. If a and α are broken down over the set $(q_n, \ldots, q_1)$, then it can be deduced that the original data b and β are identical, with a maximum of t errors.

The following is a description of a preferred embodiment of the masking method using the masking function described above, for masking a biometric print.

In the following example, the physical biometric print to be masked is a digital print characterised in having a predefined number s of real minutiae. A real minutia is a detail of a print at a given point of the physical print, such as the breakage of a line, a fork on a line, etc. Digitally, a minutia can be translated by a chain of characters including information on the position and the shape of the minutia.

According to the invention, in order to mask the physical print, the first step is to add to the set of real minutiae a set of t false minutiae, also defined by a chain of characters but which do not correspond to a real minutia of the physical print. In an example, a false minutia is defined in a completely random manner, and a set of t=80 false minutiae is added to a set of s=20 real minutiae.

The order of the real and false minutiae is mixed, for example in a random manner, and then a mixed datum $b=(b_n, \ldots, b_1)$ is formed, having n=s+t bits so that, for any i:

$b_i=1$ if position i corresponds to a real minutia and $b_i=0$ if position i corresponds to a false minutia.

The mixed datum b is then masked using the masking method according to the invention in order to produce a masked datum so that:

$$m = \prod_{i=1}^{n} q_i^{b_i} \bmod p$$

The masked datum m can then be stored in a database, on an ID card, in a memory of a chip card, etc. The masked datum m can be used as a reference datum, for example in order to verify the identity of a person, in the following manner.

The following is sufficient for verifying the identity of a person:

taking a new physical biometric print of the person and then calculating the relevant set of s real minutiae, adding t false minutiae, mixing the false minutiae and the real minutiae, determining the mixed datum β associated with the new biometric print, then masking β by means of the function $$\mu = \prod_{i=1}^{n} q_i^{\beta_i}$$

mod p so as to obtain a new masked datum μ, determining whether there is concordance between the previously stored reference datum m and the masked datum μ obtained from the new real print that was just taken.

In order to determine whether there is concordance between m and μ:

$$\lambda = \frac{m}{\mu}\bmod(p) = \frac{a}{\alpha}\bmod p$$

is calculated, followed by a and α using the relation $a*\lambda=\alpha \bmod p$, where a and α are small compared with the integer p, by the continued fraction algorithm, for example.

a and α are then broken down into prime factors, and then there is concordance if a and α are broken down into a maximum of t components of the set of prime numbers $(q_n, \ldots, q_1)$, there is no concordance otherwise.

One application considered for the masking method according to the invention relates to securing a security document, such as a bank cheque. For this, according to the invention, a biometric print of the owner of the security document is masked using a masking method as described above, in order to produce a reference datum.

According to a first embodiment of the invention, the reference datum is stored on or in the security document, for example by printing.

According to a second embodiment of the invention, the reference datum is associated with a barcode, the associated reference datum/barcode couple is stored in a database, and the barcode is stored, by printing for example, on the security document.

It is sufficient then, when the security document is handed over, for example, to take a biometric print of the person handing the document over at the same time as the document is received and then to check that the biometric print of the person handing over the document actually matches the biometric print included in the reference datum stored on the document or associated with the barcode stored on the document.

In the first embodiment of the invention, the verification can be carried out by any person, the reference datum being stored directly on the document. In the second embodiment of the invention, the verification can be carried out by any person having access to the database, who is not necessarily the person receiving the document.

The barcode is made according to known techniques. It is possible, for example, to use a barcode with one dimension, consisting in a series of vertical bars with variable thickness and separation. The choice of the shape of the barcode depends in the practice on the number of reference data to be stored, each reference datum corresponding to a different person.

The database in which the reference datum/associated barcode couples are stored is preferably accessible for verification purposes only to a reduced number of people, according to the desired level of security: access can be, for example, authorised to any person who must receive security documents or, in a more restricted fashion, only to a certificate-issuing authority.

In a practical example, the security document is a bank cheque and the digital print of its owner is stored on the cheque in the form of a barcode. A retailer has a device for reading and masking a print equipped with means for reading a print, masking it and then printing the associated masked datum. The issuing bank of the cheque has exclusive access to the database in which the masked reference datum (corresponding to the masked initial datum) and the associated barcode are stored; this access allows the bank to verify that the print left by the person that presented the cheque to the retailer and which the latter has masked and printed on the cheque, actually corresponds to that of the owner of the cheque.

The invention claimed is:

1. A method of masking biometric information, comprising the steps of: Converting physical biometric information into biometric datum b having n bits; and producing a masked datum m using the following hash function:

$$m = \prod_{i=1}^{n} q_i^{b_i} \bmod p,$$

mod p, where p is a prime number, $b_i$ is the bit at position i of biometric datum b, and $q_i$ is the prime number at position i in a set of prime numbers $(q_i \ldots q_n)$;

wherein said method is applied to data of a biometric print, comprising the steps of determining a set of s real minutiae, which are characteristic of said print, mixing and arranging the real minutiae with t false minutiae, and forming a mixed biometric datum having n=s+t bits, such that, for any i:

$b_i$=1 if position i corresponds to a real minutiae and $b_i$=0 if position i corresponds to a false minutiae and applying the hash function to this mixed datum in order to produce a masked datum.

2. The masking method according to claim 1, in which p is a large prime number and the components of the set of prime numbers are small.

3. The method according to claim 1, in which the real minutiae and the false minutiae are mixed in a random fashion.

4. The method of claim 3, further including the step of:

storing said masked datum on or in a security document.

5. A method of verifying a security document secured by a method according to claim 4, comprising the following steps:

digitizing a physical biometric print of a person presenting the security document, masking the digitised print using randomly mixed real material and false material, and said hash function, to produce a masked datum, comparing the masked datum with a reference datum, and verifying the security document if the masked datum and the reference datum are in concordance with a predefined rate of error, and refusing the document otherwise.

6. The method according to claim 5, wherein, during the comparison step, if a barcode associated with the reference datum is stored on the security document, the following steps are performed:

reading the barcode;

searching a table storing the bar code and the reference datum to obtain the reference datum associated with the barcode; and comparing the reference datum with the masked datum.

7. The method of claim 3, further including the steps of:

associating a barcode with said masked datum;

storing said barcode on or in a security document; and storing the barcode and the masked datum in a table.

8. A method of verifying a security document secured by a method according to claim 7, comprising the following steps:

digitizing a physical biometric print of a person presenting the security document, masking the digitized print using randomly mixed real material and false material, and said hash function, to produce a masked datum, comparing the masked datum with a reference datum, and verifying the security document if the masked datum and the reference datum are in concordance with a predefined rate of error, and refusing the document otherwise.

* * * * *